United States Patent [19]
White et al.

[11] Patent Number: 5,089,588
[45] Date of Patent: Feb. 18, 1992

[54] HYDROXY-FUNCTIONAL POLY(AMIDE ETHERS) AS THERMOPLASTIC BARRIER RESINS

[75] Inventors: Jerry E. White; David J. Brennan, both of Midland, Mich.; Steven Pikulin, Somerville, N.J.

[73] Assignee: The Dow Chemical Company, Midland, Mich.

[21] Appl. No.: 660,381

[22] Filed: Feb. 26, 1991

Related U.S. Application Data

[62] Division of Ser. No. 599,212, Oct. 17, 1990, abandoned.

[51] Int. Cl.$^5$ ............... C08G 59/00; C08G 65/08; C08G 65/14
[52] U.S. Cl. ............................. 528/99; 528/89; 528/97; 528/98; 528/104
[58] Field of Search .................. 528/99, 104, 89, 97, 528/98

[56] References Cited

U.S. PATENT DOCUMENTS

| | | | |
|---|---|---|---|
| 3,477,990 | 11/1969 | Dante et al. | 528/99 |
| 3,547,881 | 12/1970 | Mueller et al. | 528/99 |
| 3,725,341 | 4/1973 | Rogers et al. | 528/99 |
| 3,948,855 | 4/1976 | Perry | 528/99 |
| 4,367,328 | 1/1983 | Bertram et al. | 528/99 |
| 4,398,002 | 8/1983 | Bertram et al. | 528/99 |
| 4,410,681 | 10/1983 | Prindle | 528/99 |

*Primary Examiner*—John Kight, III
*Assistant Examiner*—Frederick Krass

[57] ABSTRACT

Hydroxy-functional poly(amide-ethers) are fabricated into articles such as rigid containers and flexible films exhibiting high barrier to oxygen transmission in both dry and moist environments. For example, a polymer prepared by reacting the diglycidyl ether of 4,4'-biphenol with N,N'-bis(m-hydroxyphenyl)-adipamide exhibits especially high barrier.

9 Claims, No Drawings

HYDROXY-FUNCTIONAL POLY(AMIDE ETHERS) AS THERMOPLASTIC BARRIER RESINS

CROSS-REFERENCE TO RELATED APPLICATION

This is a divisional of application Ser. No. 07/599,212, filed Oct. 17, 1990, now abandoned.

BACKGROUND OF THE INVENTION

This invention relates to thermoplastic polymers having pendant hydroxyl moieties and aromatic ether moieties and to articles prepared from such polymers.

Hydroxyphenoxyether polymers are known to be useful in the fabrication of articles exhibiting barrier properties. See, for example, Reinking et al, *J. Poly, Sci.*, Vol. 7, pp. 2135–2144, pp. 2145–2152 and pp. 2153–2160 (1963) and *Encyclopedia of Polymer Science and Technology*, Vol. 10, pp. 111–122. Such polymers generally have only moderate oxygen barrier, i.e., they generally exhibit transmission rates of 2 to 75 cm$^3$-mil/100 in$^2$-atm-day.

In view of the limited barrier properties of the prior art polymers having pendant hydroxyl moieties and phenoxyether moieties, it would be highly desirable to provide a polymer having a genuinely high barrier (i.e., oxygen transmission rate less than 0.5 cm$^3$-mil/100in$^2$-atm-day) to oxygen. Polymers that retain such high barrier in both dry and moist environments would be especially desirable.

SUMMARY OF THE INVENTION

The present invention is, in one aspect, a normally solid thermoplastic polymer having aromatic ether moieties and amide moieties in the backbone chain and pendant hydroxyl moieties Surprisingly, the polymer of this invention, hereinafter called a hydroxy-functional poly(amide-ether), exhibits thermoplastic character and excellent barrier to oxygen in both dry and moist environments.

In another aspect, this invention is a container suitable for packaging oxygen-sensitive materials wherein the container is fabricated of the hydroxy-functional poly(amide-ether). In a further aspect, this invention is a substantially impermeable film or coating of the polymer. In yet a further aspect, this invention is a process for preparing the poly(amide-ether) which process comprises contacting a N,N'-bis(hydroxyarylamido)hydrocarbylene with a diepoxide in the presence of a catalytic amount of an onium salt of a conjugate acid having a pK$_a$ of at least 4 under conditions sufficient to cause the hydroxyl groups to react with the epoxy groups to form the poly(amide-ether).

In addition to their use as barrier containers and films, the polymers of this invention are also useful as molding, extrusion and casting resins.

DETAILED DESCRIPTION OF ILLUSTRATIVE EMBODIMENTS

Preferably, the hydroxy-functional poly(amide-ether) has repeating units represented by the formula:

wherein each Ar$^1$ is independently a divalent aromatic moiety, each R$^1$ is a predominantly hydrocarbylene moiety, each R$^2$ is independently hydrogen or a monovalent aliphatic moiety, and each R$^3$ is independently a predominantly hydrocarbylene moiety. In the more preferred polymers, the nitrogen atom of the amide moiety

is bonded to an aromatic ring. "Predominantly hydrocarbylene" is defined as a divalent radical that is predominantly hydrocarbon, but which optionally contains a minor amount of heteroatomic moiety such as oxygen, sulfur, imino, sulfonyl, sulfoxyl and the like.

The hydroxy-functional poly(amide-ethers) of this invention are more preferably those represented by the formula:

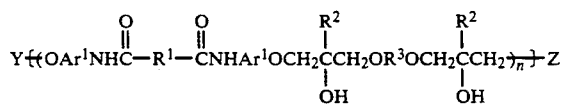

wherein Ar$^1$, R$^1$, R$^2$ and R$^3$ are as defined before, Y is hydrogen or a monovalent organic terminating group, Z is a monovalent organic terminating group, and n is a whole number from 10 to about 1000.

In the more preferred polymers, R$^1$ is a predominantly hydrocarbylene such as (1) alkylene which has from 1 to about 10 carbons which may contain a heteroatomic moiety such oxygen, sulfur, sulfonyl or sulfoxyl and (2) arylene which has from 5 to 25 carbons, may contain a heteroatomic moiety and may be substituted with alkyl, alkoxy, halo, nitro or cycloalkyl groups. R$^2$ is hydrogen or a hydrocarbyl or substituted hydrocarbyl wherein hydrocarbyl is a monovalent hydrocarbon such as alkyl, cycloalkyl, aralkyl, or aryl and the substituent(s) is a monovalent moiety which is inert in the reactions used to prepare the hydroxy-functional poly(amide-ether). R$^3$, while usually different from R$^1$, is similarly a predominantly hydrocarbylene moiety as previously defined. Ar$^1$ is arylene or substituted arylene wherein the substituent may be alkyl, alkoxy, halo, nitro or cyano. Y is hydrogen or

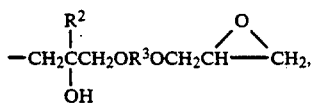

Z is

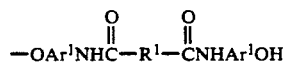

or

-continued

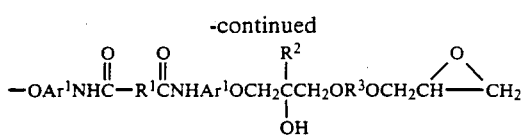

and n is a whole number from 10 to about 1000.

In the most preferred hydroxy-functional poly(amide-ethers), $R^1$ is (1) alkylene having from 1 to 10 carbons such as n-butylene, n-pentylene, n-hexylene, n-octylene; (2) alkyleneoxyalkylene such as ethyleneoxyethylene; (3) alkylenethioalkylene such as ethylenethioethylene or alkylenesulfonylalkylene such as ethylenesulfonylethylene; (4) alkyleneoxyaryloxyalkylene such as ethyleneoxyphenoxyethylene; (5) alkylenearylalkylene such as methylenephenylmethylene; or (6) arylene such as phenylene or substituted arylene such as halophenylene. Of the $R^1$ groups, n-butylene is especially preferred. Most preferably, $R^2$ is hydrogen or alkyl having from 1 to 4 carbons such as methyl, ethyl, propyl and butyl, with hydrogen being especially preferred. $R^3$ is most preferably arylene such as phenylene. biphenylene, or naphthenylene bisphenylenealkylidene such as bisphenyleneisopropylidene, bisphenylenecyanomethane and bisphenylenemethane: bisphenyleneoxide: or bis(phenyleneamido)alkane such as bis(phenyleneamido)butane, bisphenylene sulfide, bisphenylene sulfone bisphenylene ketone and bisphenylene amide, with bisphenyleneisopropylidene being especially preferred. $Ar^1$ is most preferably phenylene or substituted phenylene wherein the substituent is alkyl, halo or nitro, with phenylene being especially preferred. In the most preferred resins, n is 100–400.

The hydroxy-functional poly(amide-ethers) are preferably prepared by contacting a N,N'-bis(hydroxyphenylamido)alkane or arene, hereinafter referred to as a dihydroxyl diamide, with a diepoxide under conditions sufficient to cause the hydroxyl moieties to react with epoxy moieties to form ether linkages, and pendant hydroxyl moieties. Surprisingly, under the conditions prescribed herein, the amide moieties do not react with the epoxy groups to form any significant cross-linkages: yet the epoxy groups do react with the hydroxyl groups to form the poly(amide-ether) having the desired molecular weight. Primarily, this desired result is achieved by the use of an onium catalyst which is the onium salt of an acid having a $pK_a$ of at least 4. By "onium" is meant a salt in which the cation is an onium cation such as quaternary ammonium or phosphonium or ternary sulfonium, with phosphonium such as tetrahydrocarbylphosphonium (e.g., tetraalkyl or tetraarylphosphonium) being most preferred. The anion of the onium salt is one derived from an acid having a pKa of a least 4 such as phenate, hydroxide and carboxylate. e.g., acetate or benzoate, with acetate being most preferred. Onium salts of the stronger acids having a pKa less than 4 do not yield polymers of the desired molecular weight. Examples of such onium catalysts include tetramethylammonium acetate and ethyltriphenylphosphonium acetate. Suitable conditions are otherwise as conventionally employed in the reaction of epoxides with phenols to form ether linkages are suitably employed in preparing the resins of this invention. Examples of such suitable conditions are set forth in U.S. Pat. No. 4,647,648, which is hereby incorporated by reference in its entirety. Preferably, however, the poly(amide-ethers) are prepared at temperatures below 200° C., more preferably below 180° C. and most preferably at or below 165° C. In order to insure homogenous reaction mixtures at such temperatures, it is often desirable to use an organic solvent for the reactants such as propylene glycol phenyl ether. Preferred conditions for preparing such resins are set forth in the following working examples.

The dihydroxyl diamide is prepared by contacting a suitable diacid or diacid halide with a substantial excess of an aminoarenol under conditions sufficient to cause reaction of the amine moieties with the acid halide moieties to form amide moieties. Examples of diacids and diacid halides that are suitably employed include acids and acid halides, preferably chlorides, of the following acids: oxalic, adipic, malonic, succinic, glutaric, fumaric, maleic, pimelic, suberic, azelaic. sebacic, terephthalic, and isophthalic. Examples of aminoarenols suitably employed include the following: aminophenols such as p-aminophenol and m-aminophenol, aminonaphthols and other aminohydroxyarenes. Conditions conventionally employed for the reaction of acid chlorides with amines to form amides are suitably employed to form the dihydroxyl diamides of this invention. Examples of such suitable conditions are set forth according to J. Preston, *J. Polym. Sci.*, Vol. 8. p. 3135–3144(1970). Preferred conditions for preparing the dihydroxyl diamides are set forth hereinafter in the working examples.

Examples of preferred diepoxides include the diglycidyl ethers of dihydric phenols such as 4,4'-isopropylidene bisphenol (Bisphenol A), 4,4'-dihydroxydiphenylethylmethane, 3,3'-dihydroxydiphenyldiethylmethane, 3,4'-dihydroxydiphenylmethylpropylmethane, bisphenol, 4,4'-dihydroxydiphenyloxide, 4,4'-dihydroxydiphenylcyanomethane, 4,4'-dihydroxybiphenyl, 4,4'-dihydroxybenzophenone, 4,4'-dihydroxydiphenyl sulfide, 4,4'-dihydroxydiphenyl sulfone, 2,6-dihydroxynaphthalene, 1,4'-dihydroxynaphthalene, hydroquinone, resorcinol, catechol and other dihydric phenols listed in U.S. Pat. Nos. 4,438,254 and 4,480,082 which are hereby incorporated by reference.

The barrier containers, films and coatings of this invention are fabricated from the poly(amide-ether) using conventional fabricating techniques for normally solid, thermoplastic polymers such as extrusion, compression molding, injection molding and similar fabrication techniques commonly employed to produce such articles.

The following working examples are given to illustrate the invention and should not be construed as limiting its scope. Unless otherwise indicated, all parts and percentages are by weight.

Example 1

A. Preparation of
N,N'-Bis(m-hydroxyphenyl)adipamide

A solution of adipoyl chloride (5.5 g, 0.03 mole) in dry tetrahydrofuran (THF, 50 mL) is added dropwise to a magnetically stirred solution of m-aminophenol (13.0 g, 0.12 mole) in 150 ml of THF. A precipitate forms after 10–15 minutes and is collected by filtration and then washed with water and then with a mixture of water and tetrahydrofuran and recrystallized from an ethanol/water mixture. Analysis of the resulting 8.86 g of white solid indicates it to have the following structure:

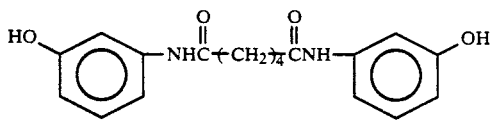

Several additional bis(hydroxyphenyl)amides are prepared using the foregoing procedure, m-aminophenol and different diacid chlorides. The resulting amides are then employed according to the following procedure to make the desired hydroxy-functional poly(amide-ethers). These polymers are then evaluated for barrier properties and the results are reported in Table I.

B. Preparation of Hydroxy Poly(amide-ethers)

A 10.5-g (31.98 mmoles) portion of the adipamide of Part A and diglycidyl ether of Bisphenol A (DGBA) (11.26 g, 32.62 mmoles, epoxy equivalent weight of 172.58) in 13 mL of freshly distilled propylene glycol phenylether are heated with stirring to 140° C.-150° C. under a nitrogen atmosphere. The diglycidyl ether is recrystallized from methanol twice before use. About 15-20 drops of ethyltriphenylphosphonium acetate (70 percent in methanol) are added as the catalyst and, after a brief induction period, the temperature of the reaction rises to 160° C.-170° C. with complete dissolution of the monomers. Upon the resultant rapid increase in viscosity of the solution, additional catalyst and solvent are added to progress the reaction to completion and to maintain effective stirring. The reaction solution is maintained at 150° C.-160° C. for 20 minutes and then cooled to 100° C. and diluted with 25 mL of dimethylformamide (DMF). The resulting solution is poured into a rapidly stirred 1:1 methanol/water mixture (400-600 mL) to precipitate the product which is then redissolved in DMF (50 mL) and reprecipitated from the methanol/water mixture. The product is dried in vacuo at 90° C. for 48 hours to yield 15.1 g (70 percent yield) of a poly(amide-ether) ($\eta$ inh=0.65 dL/g in DMF at 25° C. and 0.5 g/dL) which is represented by the formula:

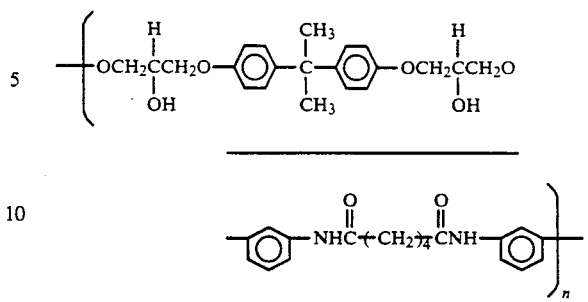

Several additional hydroxy-functional poly(amide-ethers) are prepared using the foregoing procedure and the dihydroxyamides and diepoxides corresponding to moieties shown for $R^1$, $R^3$ and $Ar^1$ in Table I. These polymers are generally represented by the following structural formula:

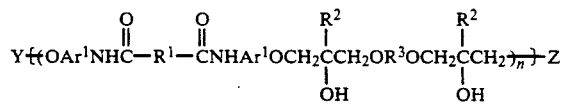

wherein $Ar^1$, $R^1$, and $R^3$ are as defined in Table I, Y is hydrogen, Z is

and n is in range of 200 to 400 and $R^2$ is hydrogen.

C. Barrier Testing

Specimens (10 cm×10 cm×0.013 cm) for oxygen barrier evaluations are prepared by compression molding samples (3.5 g) of the polymer of Part B between Teflon sheets in a brass template at 200° C. at 500 psi (3.5 mPa) for 8-10 minutes, then at 40,000 psi (275 mPa) for 2-4 minutes and then cooled at 40,000 psi for 10 minutes. Oxygen transmission rates are then measured for the samples and the results are reported in Table I.

Following the foregoing procedures, several other hydroxy-functional poly(amide-ethers) within the scope of this invention are similarly prepared and tested and the results are also recorded in Table I.

TABLE I

| Sample No. | Composition [1] | | | $\eta$ inh [2] (dL/g) | $T_g$ [3] (°C.) | OTR [4,5] | | |
|---|---|---|---|---|---|---|---|---|
| | $R^1$ | $R^3$ | $Ar^1$ | | | Temp (°C.) | <8% RH [6] | 70-90% RH [6] |
| 1 | $-(CH_2)_4-$ | -⟨⟩-C(CH_3)_2-⟨⟩- | -⟨⟩- | 1.65 | 103 | 23.3 | 1.24 | 0.79 |
| 2 | $-(CH_2)_7-$ | -⟨⟩-C(CH_3)_2-⟨⟩- | -⟨⟩- | 0.72 | 112 | 24.4 | ND | 1.2 |
| 3 | $-(CH_2)_{10}-$ | -⟨⟩-C(CH_3)_2-⟨⟩- | -⟨⟩- | 0.52 | 91 | 23.4 | ND | 3.34 |

TABLE I-continued

| Sample No. | Composition [1] R[1] | R[3] | Ar[1] | $\eta$ inh [2] (dL/g) | Tg [3] (°C.) | OTR [4,5] Temp (°C.) | <8% RH [6] | 70–90% RH [6] |
|---|---|---|---|---|---|---|---|---|
| 4 | (m-phenylene) | -C₆H₄-C(CH₃)₂-C₆H₄- | (p-phenylene) | 0.30 | 140 | 24.2 | ND | 1.15 |
| 5 | $-(CH_2)_4-$ | -C₆H₄-CH₂-C₆H₄- | (p-phenylene) | 0.43 | 92 | 23.1 | ND | 0.45 |
| 6 | $-(CH_2)_4-$ | -C₆H₄-S-C₆H₄- | (p-phenylene) | 0.51 | 94 | 23.6 | ND | 0.45 |
| 7 | $-(CH_2)_4-$ | -C₆H₄-SO₂-C₆H₄- | (p-phenylene) | 0.46 | 93 | 23.1 | ND | 0.47 |
| 8 | $-(CH_2)_4-$ | -C₆H₄-C₆H₄- (biphenyl) | (p-phenylene) | 0.45 | 110 | 23.4 | 0.50 | 0.28 (0.13)* |
| 9 | $-(CH_2)_4-$ | -C₆H₄- (phenylene) | (p-phenylene) | 0.63 | 97 | 23.6 | 0.35 | 0.19 |
| 10 | $-(CH_2)_4-$ | -C₆H₄-C(=O)-C₆H₄- | (p-phenylene) | 0.54 | 113 | 23.3 | ND | 0.26 |
| 11 | $-(CH_2)_4-$ | -C₆H₄-CH(CN)-C₆H₄- | (p-phenylene) | 0.49 | 98 | 23.4 | ND | 0.57 |
| 12 | $-(CH_2)_4-$ | (naphthalene-2,6-diyl) | (p-phenylene) | 0.65 | 109 | 23.7 | ND | 0.18 |
| 13 | $-(CH_2)_4-$ | -C₆H₄-C(CF₃)₂-C₆H₄- | (p-phenylene) | 0.52 | 120 | 23.6 | ND | 1.79 |
| 14 | $-(CH_2)_4-$ | (anthracene-diyl) | (p-phenylene) | 0.54 | 108 | 23.7 | ND | 0.38 |
| 15 | $-(CH_2)_4-$ | (m-phenylene) | (p-phenylene) | 0.55 | 97 | 23.7 | ND | 0.19 |

TABLE I-continued

| Sample No. | Composition[1] R¹ | R³ | Ar¹ | η inh[2] (dL/g) | Tg[3] (°C.) | OTR[4,5] Temp (°C.) | <8% RH[6] | 70-90% RH[6] |
| --- | --- | --- | --- | --- | --- | --- | --- | --- |
| 16 | $-(CH_2)_4-$ | 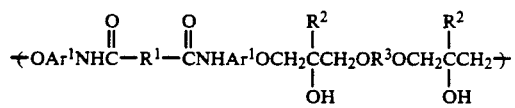 | | 0.40 | 78 | 23.7 | ND | 0.24 |

[1] R² is hydrogen
[2] η inh — inherent viscosity in DMF at 0.5 g/dL and 25° C.
[3] Tg — glass transition temperature
[4] ASTM Method D-3985 measured for compression molded films
[5] Oxygen transmission rate (OTR) measured in cc/mil/100 in²/atm/day
[6] Relative humidity of the oxygen stream
*After annealing at 270° C. for 24 hours As evidenced by the data shown in Table I, the polymers of this invention exhibit excellent barrier to oxygen transmission in a wet environment as well as in a dry environment.

Example 2

Generally following the procedure of Example 1, a poly(amide-ether) is prepared using the same reactants and catalyst as used in Example 1. The poly(amide-ether) is recovered and tested for inherent viscosity and the result is reported in Table II.

For purposes of comparison, a poly(amide-ether) is prepared using the same reactants but a different catalyst, i.e., ethyltriphenylphosphonium iodide. Since hydroiodic acid has a pKa less than 4, this comparative example is not an example of the process of this invention. The polymeric product of this comparative example is similarly recovered and tested for inherent viscosity and the result is reported in Table II.

TABLE II

| Sample No. | Composition[1] Diepoxide Type | Amount, meq Epoxy | Amide Type | Amount, meq OH | Temperature, °C. | Catalyst[2] Type/Amt., g | η inh[3], dL/g |
| --- | --- | --- | --- | --- | --- | --- | --- |
| 1 | DGE-A | 81.80 | BHPA | 80.02 | 165° C. | EtPh₃POAc/ 0.35 | 0.75 |
| C | DGE-A | 81.80 | BHPA | 80.02 | 165° C. | EtPh₃PI/ 0.13 | 0.57 |

[1] DGE-A - diglycidyl ether of bisphenol A in milliequivalents of epoxy.
BHPA - N,N-bis(4-hydroxylphenyl)pimelamide in milliequivalents of hydroxyl.
[2] EtPh₃POAc - ethyltriphenylphosphonium acetate in grams.
EtPh₃PI - ethyltriphenylphosphorium iodide in grams.
[3] η inh - inherent viscosity in dimethylformamide at 0.5 g/dL and 25° C.

As evidenced by the inherent viscosities shown in Table II, the poly(amide-ether) prepared in the presence of the phosphonium acetate catalyst exhibits a significantly greater molecular weight ($\eta_{inh}$) than the polymer prepared in the presence of the phosphonium iodide catalyst. This poly(amide-ether) having the higher molecular weight possesses higher impact strength (toughness) than the comparative polymer having the lower molecular weight.

What is claimed is:

1. A thermoplastic polymer having excellent barrier to oxygen in both dry and moist environments and having repeating units represented by the formula:

$$-(OAr^1NHC(O)-R^1-C(O)NHAr^1OCH_2\underset{OH}{C}HCH_2OR^3OCH_2\underset{OH}{C}HCH_2)-$$

wherein each Ar¹ is independently a divalent aromatic moiety, each R¹ is a predominantly hydrocarbylene moiety, each R² is independently hydrogen or a monovalent hydrocarbyl or substituted hydrocarbyl moiety, and each R³ is independently a predominantly hydrocarbylene moiety.

2. The polymer of claim 1 which is represented by the formula:

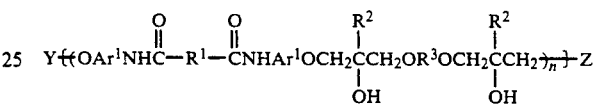

wherein Ar¹, R¹, R² and R³ are as defined in claim 1, Y is a hydrogen or a monovalent organic terminating group, Z is a monovalent terminating group, and n is a whole number from 10 to about 1000.

3. The polymer of claim 2 wherein R¹ is (1) an alkylene moiety which has from 1 to 4 carbons or a heteroalkylene which contains an alkylene group and a heteroatomic moiety which is oxygen, sulfur, sulfonyl or sulfoxyl or (2) an arylene which has from 5 to 25 carbons or heteroarylene which contains an arylene ring wherein the ring is interrupted with said heteroatomic moiety provided that the arylene group is optionally substituted with alkyl, alkoxy, halo, nitro or cyano, R² is hydrogen or a hydrocarbyl or substituted hydrocarbyl wherein the substituent(s) is a monovalent moiety which is inert in the reactions used to prepare the polymer, and R³ is an arylene which has from 5 to 25 carbons or heteroarylene which contains an arylene ring wherein the ring is interrupted with said heteroatomic moiety, Ar¹ is arylene or substituted arylene wherein the substituent is alkyl, alkoxy, halo, nitro or cyano, Y is hydrogen or

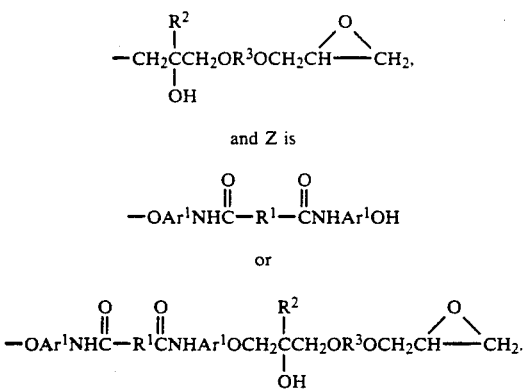

and Z is $$-OAr^1NH\overset{O}{\overset{\|}{C}}-R^1-\overset{O}{\overset{\|}{C}}NHAr^1OH$$

or $$-OAr^1NH\overset{O}{\overset{\|}{C}}-R^1\overset{O}{\overset{\|}{C}}NHAr^1OCH_2\underset{\underset{OH}{|}}{\overset{\overset{R^2}{|}}{C}}CH_2OR^3OCH_2CH\overset{O}{\overset{/\diagdown}{\text{———}}}CH_2.$$

4. The polymer of claim 3 wherein $R^1$ is n-butylene, $R^2$ is hydrogen, $R^3$ is bisphenyleneisopropylidene, $Ar^1$ is phenylene, Y is hydrogen, and n is a number from 200 to 4000.

5. The polymer of claim 1 in the form of a barrier container.

6. The polymer of claim 1 in the form of a barrier film.

7. The polymer of claim 1 having an oxygen transmission rate in the range of from about 0.18 to about 1.8 cc/mil/100in$^2$/atm/day.

8. The polymer of claim 3 prepared in the presence of a catalyst which is an onium salt of an acid having a pKa of at least 4, said polymer having an inherent viscosity of at least about 30 percent higher than that of a similar polymer prepared in the presence of a catalyst which is an onium salt of an acid having a pKa of less than 4.

9. The polymer of claim 1 in the form of a barrier coating.

* * * * *